Aug. 16, 1960

H. BLACKSTONE 2,949,055

STEREOSCOPIC SCANNER

Filed July 9, 1954

INVENTOR
HENRY BLACKSTONE
BY
*Mitchell Bechert*
ATTORNEYS

United States Patent Office 2,949,055
Patented Aug. 16, 1960

2,949,055
STEREOSCOPIC SCANNER

Henry Blackstone, Northport, N.Y., assignor to Servo Corporation of America, New Hyde Park, N.Y., a corporation of New York Filed July 9, 1954, Ser. No. 442,330

10 Claims. (Cl. 88—1)

My invention relates to improved optical-scanning means and to radiation-responsive means using such optical scanning. This invention incorporates certain improvements over the invention disclosed in the copending application of Henry Blackstone and Frank G. Willey, Serial No. 320,272, filed November 13, 1952.

It is an object of the invention to provide improved means of the character indicated.

It is another object to provide improved means for continuously and automatically scanning a field of view for varying energy levels in such field.

It is a further object to provide for simultaneous development of two integrated displays of the same field, representing simultaneous use of the same scanning means to scan said field from angularly spaced aspects.

It is a specific object to provide a stereoscopically viewable display, with a device of the character indicated.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 1 is a simplified perspective view of an aircraft equipped with apparatus of the invention and scanning the terrain beneath the aircraft;

Fig. 2 is an optical and electrical diagram schematically illustrating important component parts of equipment incorporating features of the invention;

Fig. 2A is an optical diagram schematically illustrating, in side elevation, the principles of scanning for stereoscopic viewing; and Fig. 3 is a view similar to Fig. 2 to illustrate alternative elements for a part of Fig. 2.

Briefly stated, the invention contemplates employment of a single optical scanner to develop, in conjunction with suitable radiation-responsive means, two video outputs representing concurrent responses along two spaced scan lines; in the case of an airborne device, the scan lines may conveniently be spaced in the direction of the flight axis, the scanning action being transverse to the flight axis. The two scan lines represent simultaneous looks at spaced objects, but if the two video outputs are caused to create separate displays, the same objects will appear in both displays; and, because the aspect is different for the objects displayed in one case from the aspect for the same objects displayed in another case, stereoscopic viewing is possible. For certain purposes, the delay between the time one scan line detects an object and the time at which the next scan line detects the same object is unimportant because both video outputs may be integrated into separate larger displays. However, for displays as of the cathode-ray type in which fluorescent persistence may be an important limiting factor, it is desirable that the video signal of the forward scan line shall be delayed by an amount appropriate to the spacing between scan lines, so that the lines simultaneously created on the two displays may be corresponding lines; that is, so that lines concurrently described for the respective displays may reflect scanning of the same objects but from different aspects.

Referring to Figs. 1, 2 and 2A of the drawings, my invention is shown in application to an airborne scanning device as carried by an aircraft 10 equipped with means for periodically scanning the terrain from one lateral extreme 11 to the other lateral extreme 12. The scanner may be as described in the said copending application and may thus comprise relatively fixed energy-responsive means contained within a suitable support or capsule 13, at the focus of scanning optics carried for continuous rotation in a drum-like frame 14. The drum 14 may be journalled in bearings (not shown) and supports a plurality of angularly spaced focusing elements, such as like mirrors 15—16—17 with open spaces therebetween, the spacing between mirrors being preferably equal to the width of a mirror. It is convenient to mount the elements 15—16—17 with their focal points substantially on the axis of drum rotation. Shield means (not shown) may encompass all but a localized downwardly facing window, through which the scanner sees over a wide enough angle to develop scan lines between limits 11—12. A drive motor 18 continuously rotates the drum 14.

As in said copending application, the energy-responsive means within the capsule 13 may comprise two separate elements having active areas 20—21 within the focal plane of the optics of scanner 14. The elements 20—21 may be spaced in the direction of the flight axis by an amount $\delta'$, so that for each scan developed by one of the optical elements 15—16—17, two separate lines of video intelligence will be available in the separate outputs 22—23 of elements 20—21. At all times, the scanning axes for the elements 20—21 are spaced by the angle $\delta$. The shaded areas 20'—21' in Fig. 1 illustrate the elemental terrain areas covered by the described mechanism at any single instant of time during a line sweep of the optics.

In accordance with the invention, I make use of the angular separation $\delta$ between line scans covered by the respective elements 20—21, and I cause each of these elements 20—21 to develop a separately integrated display so that by simultaneous viewing of the two displays, stereoscopic effects may be observed. In the form shown, both video outputs are suitably processed in amplifiers 24—25 and are caused separately to intensity-modulate cathode-ray display tubes 26—27. The two display tubes 26—27 may be synchronously excited by sweep circuits, as, for example, a common horizontal sweep 28 synchronized (as suggested by the dashed line 29) with optical sweeping; also, vertical sweep means 30, common to both tubes 26—27, may be driven in accordance with the $V/H$ rate of the aircraft. The $V/H$ rate will be understood as the instantaneous velocity-altitude function of the aircraft, and may be available manually by means of personal observation; alternatively, this rate function may be provided automatically through computer means 31 responding to aircraft velocity as a function of altitude (ground clearance).

In operation, for any frame depicted on the two display tubes 26—27, the developed image will be a plurality of laterally extending lines, with intensity modulations representing the local energy distribution over the scanned terrain. In the case of heat-responsive elements 20—21, similar heat maps will be developed for each such frame, and the frames depicted at 26—27 will be effectively concurrent. A stereoscopic viewing mechanism may comprise pairs of lenses 32—33, 34—35, and symmetrical reflection means 36—37—38. The persistence characteristic of the display faces of tubes 26—27 is preferably such as to permit viewing an entire frame at a time intelligently. While the tubes 26—27 and the stereoscopic viewing means are shown for the case of immediate interpretation of data, it will be understood that the display means 26—27 are merely illustrative, and that permanent graphical recording means may be employed in each case, for storage of the data in a form suitable for later interpretation by stereoscopic viewing means.

It is realized that under certain conditions, a wider effective separation base (between elements determining the respective display maps) may be desirable than is available from the structure described and indicated by the separation δ' in Fig. 2; for example, the needs for base base spread for stereoscopic viewing purposes may vary, depending upon intelligence to be interpreted. Recognizing this need, I show, in Fig. 3, an arrangement in which the stereoscopic viewing base may be selectively varied and yet in which, if desired, the two video outputs may be simultaneously supplied to the two displays for simultaneous, instantaneous viewing, line-for-line, from each of the two viewing aspects. Selective control of the stereoscopic viewing base may be achieved by optical or mechanical means to displace two energy-responsive elements with respect to each other in the sense of the flight axis. However, in Fig. 3, there is selective availability of a range of stereoscopic viewing bases, by providing a plurality of elements, such as elements 20—21 separated by the angle $δ_1$, and further elements 40—41, separated respectively by the angles $δ_2$ and $δ_3$ from lead element 20. Signal processing for the outputs of all elements may be accomplished separately at 24—25—42—43, and a selector switch 44 furnishes the output of a selected one of elements 21, 40, or 41 to a common signal-processing means or amplifier 45, for supply to one of the display tubes 27. Output of the remaining element 20 is fed through selectively variable delay means 46 to signal-processing means or amplifier 47, for intensity-modulation of the other display tube 26. Sweep circuits 28—30 may be as described for Fig. 2.

The delay means for the video output of element 20 may conveniently be of the general form described in my copending application Serial No. 394,346, filed November 25, 1953, issued on November 11, 1958, as Patent 2,860,179. In that case, delay is accomplished by a drum 49 continuously driven in synchronism with the scanner drive and carrying with it several turns of magnetic-recording wire or tape 50, formed as an endless belt so as to continuously recycle. The drum 49 is driven in the direction indicated by arrow 51, and the video signal from element 20 is impressed on the tape at recording head 52 and stored until completion of a full cycle, prior to erasure at the erasing head 52'. The circumference of drum 49 may conveniently be the equivalent of a full line-scan cycle of the scanner, so that a succession of pick-up heads 53—54—55 may extract variously delayed video intelligence, in full-line increments. The separate outputs of heads 53—54—55 are shown applied to terminals of another selector switch 56, which may be ganged, as suggested by connection 57, with selector switch 44.

In operation, a given position of switch means 44—56 will select a delay equivalent to the angular separation (or base-spread) characteristic of the particular element locations chosen for stereoscopic viewing. This will mean that as the tube 27 is writing a particular instantaneously viewed scan line across its display face, the other tube 26 will be writing the same corresponding line, but as viewed from the other end of the selected stereoscopic viewing base. Truly simultaneously display and interpretation are thus afforded.

It will be seen that I have described a relatively simple modification which can markedly increase the utility of scanners of the character indicated. Truly simultaneous display and stereoscopic interpretation are inherently achievable, either for instantaneous viewing, or for delayed viewing (should separate strip records be made of the two video signals available from amplifiers 45—47). In order to permit flexibility in the magnitude of stereoscopic effect to be observed, I have provided relatively simple means for selectably adjusting the base for stereoscopic viewing.

While I have described the invention in detail for the preferred forms illustrated, it will be understood that modifications may be made within the scope of the invention as defined in the claims which follow.

I claim:

1. In combination, radiation-responsive means producing an electrical output in accordance with radiation incident thereon, an optical scanner including a movable optical element for causing said radiation-responsive means periodically to scan one axis of a field of view, displacement means for causing said scanner to progress generally transversely of said one axis in order to develop successive line scans over the field of view, said scanner including means producing for each optical scan by said element independent electrical video responses to radiation on two separate radiation-responsive alignment axes that are divergent at a constant angle from each other and from said one axis, whereby said separate video responses represent the scanning of separate transversely spaced scan lines in said field of view, the line-scan repetition rate for each of said alignment axes being sufficient to develop from each of said video responses a separate picture of the same scanned area, and two separate display means separately responsive to said separate video responses, each said display means including sweep means synchronized with the action of said scanner and with said displacement means for simultaneously displaying two pictures representing the integrated outputs of said two video responses of said radiation-responsive means, whereby said displays may be stereoscopically viewed.

2. In combination, two radiation-responsive elements having spaced active areas, an optical scanner including an optical part for causing said elements to respond on two separate radiation-responsive alignment axes that are divergent at a constant angle from each other, said alignment axes defining a plane, said optical part being mounted for rotary movement in a sense to angularly displace said plane, means driving said optical part for periodic angular displacement of said plane, whereby said elements are caused periodically to scan separate spaced lines generally parallel to one coordinate axis of a field of view, displacement means for causing said scanner to progress generally transversely of said one coordinate axis in order to develop successive tranversely spaced scans over the field of view, the scan repetition rate being sufficient to develop for each of said video responses a separate picture of the same scanned area, two like separate display means independently responsive to the outputs of said elements, and sweep-synchronizing means connected to both said display means and synchronized with the action of said scanner and with movement effected by said displacement means.

3. In combination, two radiation-responsive elements having spaced active areas, an optical scanner including a continuously recycling optical member for causing said elements periodically to scan spaced lines generally parallel to one axis of a field of view, the angle defined by the scanning axes of said spaced areas being constant during the scanning of said field of view, the spacing of said elements being generally transverse to said one axis, displacement means for causing said scanner to progress generally transversely of said one axis in order to develop successive scans over the same field of view; whereby, in the sense of movement effected by said displacement means, one of said elements scans over a rearward aspect and laterally of said sense of movement, while the other of said elements scans over a forward aspect and laterally of said sense of movement, the scan repetition rate being sufficient to develop for each of the video outputs of said elements a separate picture of the same scanned area; means directly coupling the output of said one element to one of said display means, delay means coupling the output of said other element to the other of said display means and with a delay with respect to the coupling of the other element to the other display means, said delay being substantially an integer multiple of a full line-scan cycle of said scanner, and sweep-synchronizing means connected to both said display means and synchronized with recycling action of said scanner and with movement of said displacement means.

4. In combination, radiation-responsive means including plural spaced element means producing separate electrical outputs in accordance with incident radiation, a single movable optical scanner including drive means for causing all said radiation-responsive means simultaneously and periodically to scan on separate radiation-responsive alignment axes with constant angular divergence from each other, said alignment axes defining a plane, and the direction of movement of said scanner being such as to angularly displace said plane, whereby said element means are caused periodically to scan separate spaced lines generally parallel to one coordinate axis of a field of view, displacement means for causing said scanner to progress generally transversely of said one coordinate axis in order to develop successive displaced scans over the field of view, the scan-repetition rate being sufficient to develop for the video output of each said element means a separate picture of the same scanned area, two like display means synchronized with scanner movement and with movement effected by said displacement means, means directly connecting the output of one of said element means to one of said display means, and selectively adjustable switch means for connecting a selected one of the other of said element means to the other of said display means.

5. In combination, radiation-responsive means including three spaced element means producing independent electrical output signals in response to radiation incident thereon, an optical scanner including means for causing said radiation-responsive means periodically to scan on constant angularly divergent alignment axes spaced lines generally parallel to one axis of a field of view, displacement means for causing said scanner to progress generally transversely of said one axis for development of successive scans over the field of view, whereby said element means may be said to lead or trail each other in accordance with the order in which said displacement means causes their scan lines to cover a given portion of the field of view, the scan-repetition rate being sufficient to develop for the video output of each element means a separate picture of the same scanned area, two like display means synchronized with scanner movement and with movement effected by said displacement means, and means including a selectively operable switch independently connecting the output of a selected one of said element means in intensity-modulating relation with one of said display means and the output of another of said element means in intensity-modulating relation with the other of said display means, the connection of the leading element means to its display means including selectively operable variable delay means.

6. The combination of claim 5, wherein the selective delay available at said delay means is substantially an integer multiple of a scanning sweep period.

7. An airborne scanning device, comprising a single optical scanning means and means for creating two simultaneous displays, said optical means including focusing means, two relatively fixed energy-responsive elements at the focus of said focusing means, said optical means imaging both said elements in spaced scan lines along alignment axes of constant angular divergence from each other, means for continuously rotating said focusing means about an axis inclined to the optical axis of said focusing means, said rotation axis substantially intersecting said energy-responsive means and being oriented in the general direction of the flight axis, the scan-repetition rate being sufficient to develop for the video output of each of said elements a separate picture of the scanned area, said displays including a horizontal sweep synchronized with rotation of said focusing means, intensity-modulation means for the two separate displays and separately responsive to the outputs of said two energy-responsive elements, vertical scan-control means for said displays, and computer means responsive to velocity as a function of altitude and in controlling relation with said vertical scan-control means.

8. In combination, an aircraft and a scanning device carried thereby, said device comprising two relatively fixed radiation-responsive elements producing independent electrical outputs in response to incident radiation, optical scanning means simultaneously imaging both said elements on constantly angularly diverging alignment axes and causing said elements periodically to scan beneath the aircraft and laterally with respect to the direction of the flight axis, said alignment axes being oriented with one forward of the other in the sense of flight direction, whereby one of said elements traverses periodic scan lines on an aspect forward of the aspect of the scan lines traversed by the other of said elements, the scan-repetition rate being sufficient to develop for the video output of each of said elements a separate picture of the scanned area, means separately responsive to the outputs of said elements for creating simultaneous displays of a plurality of successive lines of said outputs, and stereoscopic viewing means for simultaneously viewing both displays.

9. In combination, an aircraft and a scanning device carried thereby, said device comprising three energy-responsive elements fixedly spaced generally along the flight axis, optical scanning means including a single optical member for causing all said elements periodically to scan beneath the aircraft and transversely of the flight axes on constantly angularly divergent alignment axes that are divergent in the flight direction, whereby for each sweep cycle of said scanning means one of said elements is caused to scan a line on the terrain that is spaced forwardly of a line simultaneously scanned by a second of said elements, and whereby the third element scans a line that is spaced rearwardly of the line scanned by said second element, the scan-repetition rate being sufficient to develop for the video output of each of said elements a separate picture of the scanned area, two separate display means synchronized with each other and with scan action and having intensity-modulation connections separately responsive to the outputs of said elements, and selectively operable switch means for independently connecting a selected two of said elements to respective of said intensity-modulation connections, whereby the effective spacing between simultaneously scanned lines is adjustably fixed.

10. A scanning device according to claim 9, in which the connection from the leading one of the selected elements to its display means includes delay means.

References Cited in the file of this patent

UNITED STATES PATENTS

| | | |
|---|---|---|
| 1,876,272 | Bayer | Sept. 6, 1932 |
| 2,253,975 | Guanella | Aug. 26, 1941 |
| 2,311,769 | Mitchell | Feb. 23, 1943 |
| 2,417,446 | Reynolds | Mar. 18, 1947 |
| 2,419,024 | Iams | Apr. 15, 1947 |
| 2,422,135 | Sanders | June 10, 1947 |
| 2,439,295 | Hammond et al. | Apr. 6, 1948 |
| 2,449,542 | Ayres et al. | Sept. 21, 1948 |
| 2,496,674 | Omberg | Feb. 7, 1950 |
| 2,709,716 | Haller | May 31, 1955 |
| 2,784,400 | Ehrenfried | Mar. 5, 1957 |
| 2,866,373 | Doyle et al. | Dec. 30, 1958 |